US012298789B2

(12) United States Patent
Ernst et al.

(10) Patent No.: US 12,298,789 B2
(45) Date of Patent: May 13, 2025

(54) DIGITALLY AUGMENTED PNEUMATIC CONTROL

(71) Applicant: Hamilton Sundstrand Corporation, Charlotte, NC (US)

(72) Inventors: Jeffrey Ernst, Wethersfield, CT (US); Scott W. Simpson, Feeding Hills, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/170,292

(22) Filed: Feb. 8, 2021

(65) Prior Publication Data

US 2022/0147074 A1 May 12, 2022

Related U.S. Application Data

(60) Provisional application No. 63/110,477, filed on Nov. 6, 2020.

(51) Int. Cl.
*G05D 16/20* (2006.01)
*B64D 13/02* (2006.01)
*B64D 13/04* (2006.01)

(52) U.S. Cl.
CPC ........... *G05D 16/202* (2013.01); *B64D 13/04* (2013.01)

(58) Field of Classification Search
CPC ...... B64D 13/04; B64D 13/02; G05D 16/202; G05D 13/202; G05D 13/2097; F15B 2211/6323

(Continued)

(56) References Cited

U.S. PATENT DOCUMENTS 2,456,215 A * 12/1948 Price .................. B64D 13/02
454/73
3,433,251 A * 3/1969 Avant .................. B64D 13/04
137/488
(Continued)

FOREIGN PATENT DOCUMENTS

CA 3069702 A1 * 9/2020 ............. B64D 13/02
EP 3683425 A1 7/2020
(Continued)

OTHER PUBLICATIONS

CSS, How Does Airplane Cabin Pressure Work, https://www.ccsdualsnap.com/cabin-pressure-in-aircraft/, dated Aug. 6, 2020 (Year: 2020).*

(Continued)

*Primary Examiner* — Steven S Anderson, II
(74) *Attorney, Agent, or Firm* — CANTOR COLBURN LLP

(57) ABSTRACT

An airflow control system includes a valve including a valve disk rotatable within a flow control duct and a valve actuator connected to the valve disk. The valve actuator is operable to adjust a position the valve disk. A pneumatic controller is configured to regulate a pressure within the flow control duct downstream of the valve disk by adjusting the position of the valve disk when the pressure within the flow control duct downstream of the valve disk exceeds a regulation pressure set point. A torque motor is fluidly connected to the valve actuator and a digital controller is operably coupled to the torque motor. The digital controller is configured to regulate the pressure within the flow control duct downstream of the valve disk independently from the pneumatic controller.

15 Claims, 1 Drawing Sheet

(58) Field of Classification Search
USPC .......................................................... 454/74
See application file for complete search history.

(56) References Cited

U.S. PATENT DOCUMENTS

| | | | | | |
|---|---|---|---|---|---|
| 3,537,644 | A | * | 11/1970 | Davison | B64D 13/02 236/80 R |
| 4,617,958 | A | * | 10/1986 | Seidel | G05D 16/2095 137/488 |
| 4,671,318 | A | * | 6/1987 | Benson | F02C 9/18 60/785 |
| 4,735,056 | A | * | 4/1988 | Goodman | B64D 13/08 236/80 A |
| 4,773,307 | A | * | 9/1988 | Goodman | B64D 13/02 454/73 |
| 4,779,644 | A | * | 10/1988 | Benson | B64D 13/00 60/39.15 |
| 5,135,161 | A | * | 8/1992 | Goodman | B64D 13/08 454/262 |
| 7,147,430 | B2 | * | 12/2006 | Wiggins | F02C 7/277 137/488 |
| 7,264,017 | B2 | * | 9/2007 | Denike | F16K 17/046 454/75 |
| 8,047,226 | B2 | * | 11/2011 | Kesner | F01D 17/145 251/282 |
| 8,286,661 | B2 | * | 10/2012 | Krake | F16K 31/423 137/487 |
| 9,957,052 | B2 | * | 5/2018 | Fox | B64D 13/06 |
| 10,641,183 | B2 | | 5/2020 | Joudareff et al. | |
| 10,669,945 | B2 | * | 6/2020 | Greenberg | F01D 15/12 |
| 2006/0019594 | A1 | * | 1/2006 | Horner | B64D 13/02 454/74 |
| 2009/0314364 | A1 | | 12/2009 | Kesner et al. | |
| 2014/0361202 | A1 | | 12/2014 | Maljanian et al. | |
| 2016/0214723 | A1 | * | 7/2016 | Fox | B64D 13/06 |
| 2018/0058333 | A1 | * | 3/2018 | Foutch | F02C 9/18 |
| 2018/0230852 | A1 | | 8/2018 | Greenberg et al. | |
| 2019/0106218 | A1 | * | 4/2019 | Parkin | B64D 13/04 |
| 2019/0291872 | A1 | * | 9/2019 | Kamenetz | F02C 6/08 |
| 2020/0232577 | A1 | * | 7/2020 | Dehais | F16K 31/1635 |

FOREIGN PATENT DOCUMENTS

| | | | | | |
|---|---|---|---|---|---|
| GB | 1048713 | A | * | 11/1966 | F24F 11/75 |
| GB | 2106635 | A | * | 4/1983 | B64D 13/08 |
| WO | WO-9407745 | A1 | * | 4/1994 | B64D 13/04 |

OTHER PUBLICATIONS

European Extended Search Report; European Application No. 21206786.2; Date: Mar. 21, 2022; 9 pages.
European Office Action issued for European Application No. 21 206 786.2; Report Mail Date Feb. 2, 2023 (pp. 1-5).
European Office Action for European Application No. 21206786.2; Report Mail Date Nov. 6, 2023; 7 pages.
European Office Action issued for European Application No. 21 206 786.2; Mailed Jul. 3, 2024, 5 pages.

* cited by examiner

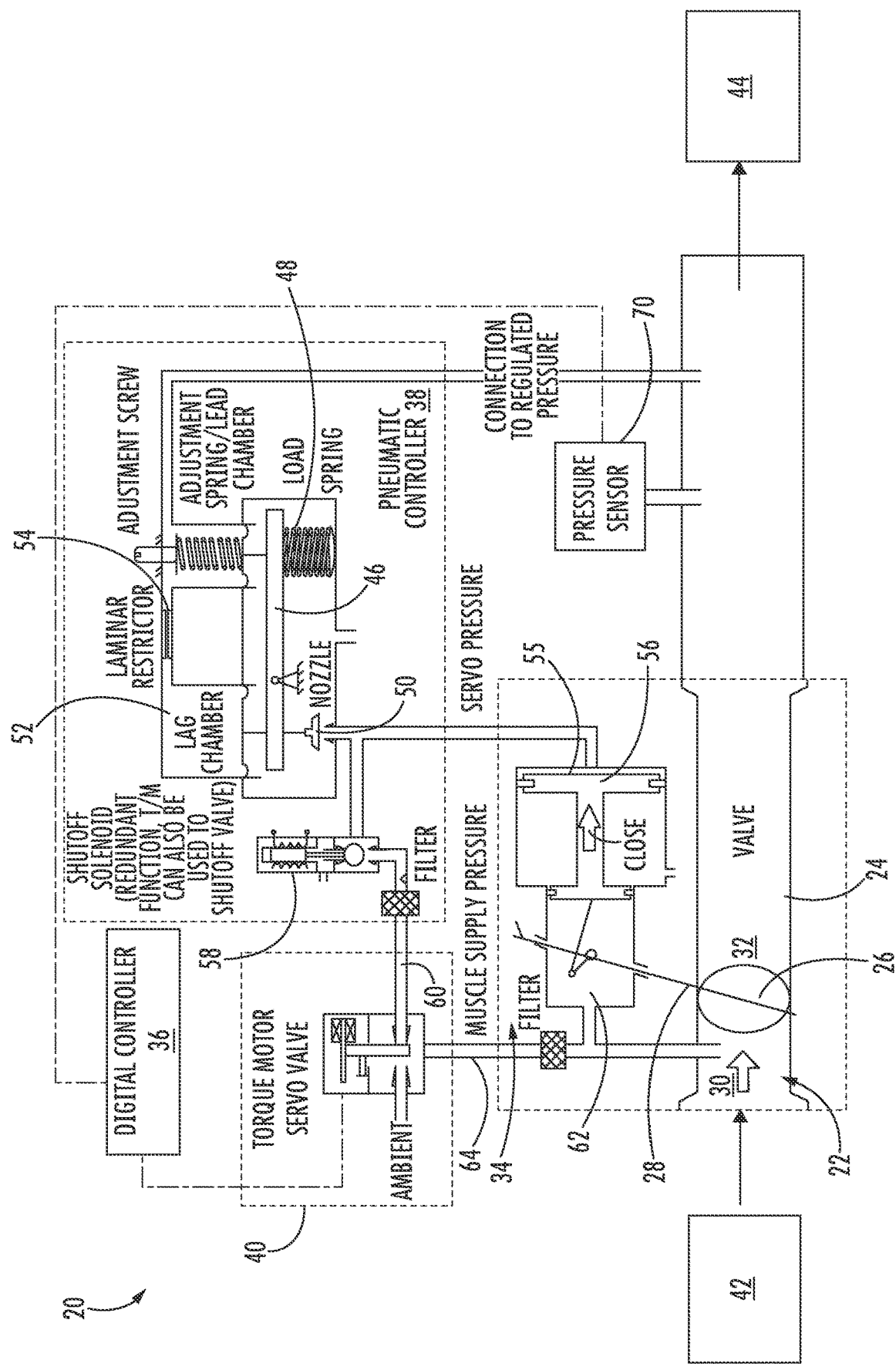

DIGITALLY AUGMENTED PNEUMATIC CONTROL

CROSS REFERENCE TO RELATED APPLICATION

This application claims the benefit of U.S. Provisional Application 63/110,477 filed Nov. 6, 2020, the disclosure of which is incorporated herein by reference in its entirety.

BACKGROUND

Embodiments disclosed herein relate to valves and, more particularly, to a pressure regulation system associated with an actuated valve.

Bleed systems, such as those for aircraft, generally involve taking compressed air from an engine, and converting it to various temperatures and pressures suitable for one or more uses. Pressure is usually managed through one or more bleed control valves, such as a butterfly valve for example. Depending on the configuration of the aircraft, these bleed control valves are generally controlled pneumatically.

SUMMARY

According to an embodiment, an airflow control system includes a valve including a valve disk rotatable within a flow control duct and a valve actuator connected to the valve disk. The valve actuator is operable to adjust a position the valve disk. A pneumatic controller is configured to regulate a pressure within the flow control duct downstream of the valve disk by adjusting the position of the valve disk when the pressure within the flow control duct downstream of the valve disk exceeds a regulation pressure set point. A torque motor is fluidly connected to the valve actuator and a digital controller is operably coupled to the torque motor. The digital controller is configured to regulate the pressure within the flow control duct downstream of the valve disk independently from the pneumatic controller.

In addition to one or more of the features described above, or as an alternative, in further embodiments the digital controller is configured to trim the pressure within the flow control duct relative to the regulation pressure set point.

In addition to one or more of the features described above, or as an alternative, in further embodiments the valve actuator includes a piston and translation of the piston rotates the valve disk.

In addition to one or more of the features described above, or as an alternative, in further embodiments the pneumatic controller includes a lever and a second valve, wherein the lever is rotatable to adjust a position of the second valve in response to the pressure within the flow control duct downstream of the valve.

In addition to one or more of the features described above, or as an alternative, in further embodiments when the pressure within the flow control duct downstream of the valve disk is less than the regulation pressure set point, the second valve is closed.

In addition to one or more of the features described above, or as an alternative, in further embodiments when the pressure within the flow control duct downstream of the valve disk is greater than the regulation pressure set point, the second valve is open.

In addition to one or more of the features described above, or as an alternative, in further embodiments the lever has a preload, and the preload of the lever is equal to the regulation pressure set point.

In addition to one or more of the features described above, or as an alternative, in further embodiments a biasing member is connected to the lever, and a biasing force of the biasing member is equal to the preload.

In addition to one or more of the features described above, or as an alternative, in further embodiments the airflow control system is on an aircraft.

According to another embodiment, an aircraft includes an environmental control system for conditioning air, a bleed air system for providing a flow of air to the environmental control system, and an airflow control system arranged between the bleed air system and the environmental control system. The airflow control system includes a pneumatic controller and a digital controller. The pneumatic controller and the digital controller are independently operable to regulate a pressure of the flow of air provided to the environmental control system.

In addition to one or more of the features described above, or as an alternative, in further embodiments the pneumatic controller is operable to maintain the pressure of the flow of air at or below a regulation pressure set point.

In addition to one or more of the features described above, or as an alternative, in further embodiments the digital controller is operable to adjust the pressure of the flow of air to equal a digital set point, the digital set point being less than the regulation pressure set point.

According to another embodiment, a method of regulating a pressure of a flow of air includes providing a portion of the flow of air to a pneumatic controller, determining if the pressure of the portion of the flow of air exceeds a regulation pressure set point of the pneumatic controller, comparing a parameter of the portion of the flow of air to a digital set point when the pressure of the portion of the flow of air is below the regulation pressure set point, and adjusting a position of a valve controlling the flow of air in response to the comparison of the parameter and the digital set point.

In addition to one or more of the features described above, or as an alternative, in further embodiments comprising adjusting a position of the valve controlling the flow of air in response to determining that the parameter of the portion of the flow of air exceeds the regulation pressure set point.

In addition to one or more of the features described above, or as an alternative, in further embodiments adjusting the position of the valve controlling the flow of air in response to determining that the parameter of the portion of the flow of air exceeds the regulation pressure set point includes rotating a lever of the pneumatic controller to open a second valve, the second valve being operably coupled to the valve.

In addition to one or more of the features described above, or as an alternative, in further embodiments comprising sensing the parameter of the portion of the flow of air and communicating the sensed parameter to a digital controller, wherein the digital controller is operable to compare the parameter to the digital set point.

In addition to one or more of the features described above, or as an alternative, in further embodiments the parameter is pressure.

In addition to one or more of the features described above, or as an alternative, in further embodiments the parameter is flow rate.

In addition to one or more of the features described above, or as an alternative, in further embodiments adjusting the position of a valve controlling the flow of air in response to the comparison of the parameter and the digital set point includes commanding movement of a torque motor, the torque motor being operably coupled to the valve.

BRIEF DESCRIPTION OF THE DRAWING

The following descriptions should not be considered limiting in any way. With reference to the accompanying drawing, like elements are numbered alike:

The Figure is a schematic diagram of a valve and a pressure regulation system of the valve according to an embodiment.

DETAILED DESCRIPTION

A detailed description of one or more embodiments of the disclosed apparatus and method are presented herein by way of exemplification and not limitation with reference to the Figure.

An example of an airflow control system is illustrated in FIG. 1. The airflow control system 20, as shown, includes a valve 22 having a valve housing 24, valve disk 26, and shaft 28. In the illustrated, non-limiting embodiment, the valve is a butterfly-type valve. However, it should be understood that any suitable type of valve is within the scope of the disclosure. The valve housing 24 defines a flow control passage having a first portion 30 upstream of the valve disk 26 and a second portion 32 downstream of the valve disk 26. The valve disk 26 is a closure element rotatable within the flow control passage defined by the housing 24 to manage flow between the upstream portion 30 and the downstream portion 32 of the flow passage.

A valve actuator 34, which can be driven by a fluid, such as air, is operable to rotate the valve disk 26 between a plurality of positions. The valve actuator 34 may rotate the valve disk 26 over a range between a fully closed position and a fully open position to regulate pressure in the downstream portion 32 of the flow passage. Operation of the valve actuator 34 can be managed, for example, using a digital controller 36 and/or a pneumatic controller 38. A torque motor 40 is operable to adjust a size of one or more flow restrictions in accordance with a command from the digital controller 36 to open or close the valve 22. Further, the pneumatic controller 38, which functions as a pressure regulator, is similarly operable to close or open the valve 22.

The airflow control system 20 may form part of a vehicle. For example, in an embodiment, the airflow control system 20 is part of an aircraft bleed air system and the valve 22 is a pressure regulating and shutoff valve arranged within a bleed air manifold. Air from a gas turbine engine or an auxiliary unit of the aircraft, illustrated schematically at 42, is provided to the upstream portion 30 of the flow passage, and the air within the downstream portion 32 of the flow passage may be provided to an environmental control system (ECS) of an aircraft, illustrated schematically at 44. However, it will be appreciated that airflow control system 20 is not necessarily limited to aircraft bleed systems or even to an aircraft, and thus can be adapted to find use in numerous other airflow control applications.

The pneumatic controller or pressure regulator 38 in conjunction with the torque motor 40 is operable to control the regulation pressure of the valve 22. The pneumatic controller 38 has a fixed regulation set point which can be trimmed or adjusted using the torque motor 40. In the illustrated, non-limiting embodiment, the pneumatic controller 38 includes a cantilevered lever 46 having a biasing member 48, such as a coil spring for example, connected to the lever 46 adjacent a first end and a valve 50, such as a poppet valve for example, connected to the lever 46 adjacent to a second end thereof.

In an embodiment, the pneumatic controller 38 has a fixed regulation pressure set point. This regulation pressure set point is defined by the preload applied to the lever 46. In the illustrated, non-limiting embodiment, the preload applied to the lever is equal to the biasing force of the biasing member 48. Accordingly, it is only when the pressure applied to the lever 46 exceeds the regulation pressure set point that the lever 46 will pivot about its axis and adjust a position of the poppet valve 50.

In an embodiment, the pneumatic controller 38 additionally includes a lag chamber 52 connected to the downstream portion 32 of the flow passage via a laminar restrictor or orifice 54. This connection results in lag compensation which provides for stable operation of the pneumatic controller 38. It should be understood that a pneumatic controller 38 having another configuration is also contemplated herein.

The functional schematic of the system 20 shown in the FIGURE, illustrates how these components are interconnected. In the illustrated, non-limiting embodiment, the pneumatic controller 38 is fluidly coupled to the downstream portion 32 of the flow passage. Accordingly, the pressure within the downstream portion 32 of the flow passage exerts a force on the lever 46 of the pneumatic controller 38. The poppet valve 50 is fluidly connected to a first chamber 55 arranged adjacent a first side of the movable piston 56 of the valve actuator 34. Movement of the lever 46 is used to control a position of the poppet valve 50 and therefore to control the servo pressure acting on the piston 56 of the valve actuator 34 operably coupled to the pressure regulating valve 22.

When the pressure within the downstream portion 32 of the flow passage is below the regulation pressure set point of the pneumatic controller 38, the preload on the lever 46 positions the lever 46 such that the poppet valve 50 is closed. When the poppet valve 50 is closed, the piston 56 of the valve actuator 34 is configured to move the valve disk 26 to a fully open position. When the pressure within the downstream portion 32 of the flow passage exceeds the regulation pressure set point, the pressure acting on the first end of the lever 46 of the pneumatic controller 38 will oppose and exceed the biasing force of the biasing member 48, causing the lever 46 to rotate and open the poppet valve 50. When the poppet valve 50 is open, the servo pressure acting on the piston 56 drops, causing the piston 56 to translate, thereby closing the valve 22. Accordingly, the pneumatic controller 38 coupled to the flow passage and the valve actuator 34 forms a loop that continuously adjusts the servo pressure (and hence the position of the valve disk 26) to maintain the regulated pressure within the downstream portion 32 of the flow passage at the desired set-point.

In an embodiment, a shutoff device 58, such as a solenoid for example, is fluidly connected to the passage connecting the poppet valve 50 and the valve actuator 34. In such embodiments, the shutoff device 58 may be operated to adjust the servo pressure, within the conduit. Operation of the shutoff device 58 provides a manual override with respect to the pneumatic controller 38 and causes the poppet valve 50 to shut.

The torque motor 40 provides secondary control of the servo pressure independently from the pneumatic controller 38. In an embodiment, the torque motor 40 is operable to adjust a flow to the valve actuator 34 to open or close the valve 22 in response to a command generated by the digital controller 36. The torque motor 40 is fluidly coupled to the first chamber 55 of the valve actuator 34 via a first flow path 60 that overlaps with the flow path extending from the pneumatic controller 38. The torque motor 40 is additionally fluidly coupled to a second chamber 62 of the valve actuator 34 arranged adjacent an opposite side of the piston 56 via a second flow path 64. Relative pressure within the first and second flow paths are controller to drive rotation of the valve disk 26 to a desired position.

In an embodiment, the torque motor 40 is configured to provide full digital control of the regulation pressure when the regulation pressure is below the regulation pressure set point of the pneumatic controller 38. The digital controller 36, in combination with the torque motor 40, can digitally trim the pressure in the bleed manifold.

As shown, at least one sensor 70 is operable to detect a parameter within the downstream portion 32 of the flow passage. In an embodiment, the sensor 70 is configured to detect the regulation pressure within the downstream portion 32 of the flow passage. Alternatively, or in addition, the sensor 70 is configured to detect the flow rate within the downstream portion of the flow passage. The measurements sensed by the sensor 70 is communicated from the sensor 70 to the digital controller 36. The digital controller 36 is configured to process the signal and compare the sensed data to a selected digital pressure set-point. In response to this comparison, the digital controller 36 sends a signal to the torque motor 40 commanding operation to either increase, decrease or maintain the current pressure regulation.

In an embodiment, the digital set-point is defined in software, such as an algorithm, that is embedded in or accessed by the digital controller 36. Further, the digital set-point may be based on the system needs, and therefore can be fixed or variable based on the design of the system and the control software. Pneumatic controllers, such as controller 38 for example, have inherent inaccuracy to their set-point due to friction in the actuator. In an embodiment, the digital controller 36 is configured to compensate for this inaccuracy by sensing the manifold pressure and adjusting the digital set-point. Accordingly, if the pneumatic controller 38 is regulating high due to friction, the digital controller 36 will sense the high pressure and lower the digital set-point. Similarly, if the pneumatic controller 38 is regulating low due to friction, the digital controller 36 will increase the digital set-point as compensation.

In addition, in embodiments having multiple sources (engines) connected to a single manifold (each source having its own pressure regulation control), the digital controller 36 may be configured to calculate the required digital pressure set-point(s) required for each valve in order to extract equal air flow from each source. In such embodiments, the digital set-point(s) permit correcting physical and operational differences between the sources and the pneumatic controller set point. Alternatively, or in addition, the digital set-point may be adjustable based on the required input pressure/flow needed for systems downstream of the manifold.

An airflow control system as illustrated and described herein allows for greater control of the pressure of a flow of bleed air provided to an environmental control system.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airflow control system comprising:
   a valve including a valve disk rotatable within a flow control duct;
   a sensor operably coupled to the flow control duct at a location downstream from the valve disk, the sensor being operable to measure a pressure;
   a valve actuator including a movable piston connected to the valve disk, wherein the valve actuator is operable to adjust a position the valve disk;
   a pneumatic controller configured to regulate a pressure within the flow control duct downstream of the valve disk, wherein the pneumatic controller is fluidly coupled to a first side of the movable piston and is operable to adjust the position of the valve disk via the valve actuator based on the pressure within the flow control duct downstream of the valve disk, the pneumatic controller including a lever, a biasing member connected to a first end of the lever and a second valve arranged at the second end of the lever, the biasing member being operable to bias the lever and the second valve toward a closed position wherein the lever is rotatable to adjust a position of the second valve in response to a pressure within the flow control duct downstream of the valve, wherein the preload applied to the lever by the biasing member is equal to the regulation set point;
   a torque motor fluidly connected to a second side of the movable piston; and
   a digital controller operably coupled to the torque motor and to the sensor, the pneumatic controller being independently operable from the digital controller, wherein the digital controller has a digital pressure set point, and the digital controller is operable to command operation of the torque motor to regulate the pressure within the flow control duct downstream of the valve disk in response to a difference between the digital set point and the pressure measured by the sensor.

2. The airflow control system of claim 1, wherein translation of the piston rotates the valve disk.

3. The airflow control system of claim 1, wherein when the pressure within the flow control duct downstream of the valve disk is less than the regulation pressure set point, the second valve is closed.

4. The airflow control system of claim 1, wherein when the pressure within the flow control duct downstream of the valve disk is greater than the regulation pressure set point, the second valve is open.

5. The airflow control system of claim 1, a biasing force of the biasing member is equal to the preload.

6. The airflow control system of claim 1, wherein the airflow control system is on an aircraft.

7. The airflow control system of claim 6, wherein the airflow control system is part of a bleed air system of the aircraft.

8. An aircraft comprising:
an environmental control system for conditioning air;
a bleed air system for providing a flow of air to the environmental control system; and
a valve arranged within a flow path of the flow of air provided to the environmental control system;
an airflow control system arranged between the bleed air system and the environmental control system, the airflow control system including:
a sensor for measuring a pressure of the flow path downstream of the valve; and
a pneumatic controller and a digital controller, the pneumatic controller and the digital controller being independently operable to regulate a pressure of the flow of air provided to the environmental control system, wherein both the pneumatic controller and the digital controller are configured to regulate a pressure of the flow of air based on a pressure of the flow of air downstream from the valve, the digital controller being operable in response to the pressure measured by the sensor and a digital set point, the digital set point being adjustable to compensate for inaccuracy of the pneumatic controller;
wherein the pneumatic controller includes a lever, a biasing member connected to a first end of the lever and a second valve arranged at the second end of the lever, wherein the biasing member biases the lever and the second valve toward a closed position.

9. The aircraft of claim 8, wherein the pneumatic controller is operable to maintain the pressure of the flow of air at or below a regulation pressure set point.

10. The aircraft of claim 9, wherein the digital controller is operable to adjust the pressure of the flow of air to equal the digital set point, the digital set point being less than the regulation pressure set point.

11. A method of regulating a pressure of a flow of air comprising:
providing a valve positioned within a duct, the valve being adjustable to control a flow of air through the duct;
providing a portion of the flow of air from the duct, downstream of the valve, to a pneumatic controller, the pneumatic controller including a lever, a biasing member connected to a first end of the lever and a second valve arranged at the second end of the lever, wherein the biasing member biases the lever and the second valve toward a closed position;
pivoting the lever to adjust a position of the second valve of the pneumatic controller in response to determining that the pressure of the downstream portion of the flow passage exceeds the regulation pressure set point of the pneumatic controller;
sensing a pressure within the duct downstream from the valve via a sensor and communicating the pressure to a digital controller,
determining if the pressure of the portion of the flow of air exceeds a regulation pressure set point of the pneumatic controller;
comparing the sensed pressure to a digital set point when the pressure of the portion of the flow of air is below the regulation pressure set point; and
operating a torque motor operably coupled to the valve to adjust a position of the valve in response to the comparison of the sensed pressure and the digital set point; and
adjusting the digital set point based on a sensed pressure to compensate for inaccuracy of the pneumatic controller.

12. The method of claim 11, further comprising adjusting a position of the valve controlling the flow of air in response to determining that the parameter of the portion of the flow of air exceeds the regulation pressure set point.

13. The method of claim 12, wherein the parameter of the portion of the flow of air is pressure.

14. The method of claim 12, wherein the parameter of the portion of the flow of air is flow rate.

15. The method of claim 11, wherein adjusting the position of the valve controlling the flow of air in response to the comparison of the parameter and the digital set point includes commanding movement of a torque motor, the torque motor being operably coupled to the adjustable valve.

* * * * *